United States Patent [19]

Calderoni

[11] Patent Number: 4,521,005
[45] Date of Patent: Jun. 4, 1985

[54] SPRING RETAINER

[75] Inventor: Sergio L. Calderoni, Dearborn, Mich.

[73] Assignee: General Motors Corporation, Detroit, Mich.

[21] Appl. No.: 528,437

[22] Filed: Sep. 1, 1983

[51] Int. Cl.³ ............................................. F16F 1/12
[52] U.S. Cl. .................................................. 267/179
[58] Field of Search ...................... 267/4, 60, 62, 177, 267/179

[56] References Cited

U.S. PATENT DOCUMENTS

| 362,174 | 5/1887 | Palmatier | 267/179 X |
|---|---|---|---|
| 446,203 | 2/1891 | Cochennour et al. | 267/179 X |
| 2,456,302 | 12/1948 | Mocnik | 248/468 |
| 3,034,170 | 5/1962 | Koebel | 16/197 |
| 3,336,942 | 8/1967 | Keith et al. | 267/179 X |
| 3,851,517 | 12/1974 | Greenleaf | 72/352 |
| 3,921,966 | 11/1975 | Genbauffe | 267/166 |
| 4,162,064 | 7/1979 | Bouton et al. | 267/177 |

FOREIGN PATENT DOCUMENTS 315897 3/1934 Italy ..................................... 267/60

Primary Examiner—Duane A. Reger
Attorney, Agent, or Firm—Patrick M. Griffin

[57] ABSTRACT

A spring retainer for retaining a compression spring within a spring pocket formed in the bed of a press includes a circular base of a diameter slightly smaller than the diameter of the pocket and a circumferentially spaced series of radially flexible tangs around the perimeter thereof. Each tang includes a retention wall with a radially inwardly extending bias portion spaced from the base so as to form a helically rising angle with the other bias portions so that the lower coil of the spring may be threaded onto the retainer with the bias portions engaging a helically rising upper surface of the lower coil. Each tang also includes a radially outwardly extending pointed barb. After threadably attaching the spring, it is inserted down into the pocket with the pointed barbs on the tangs lightly engaged with the wall of the spring pocket. The spring may be further threaded to more tightly engage the barbs with the wall as the tangs flex to maintain the spring within the pocket. The spring may be threaded back to allow removal from the pocket.

3 Claims, 7 Drawing Figures

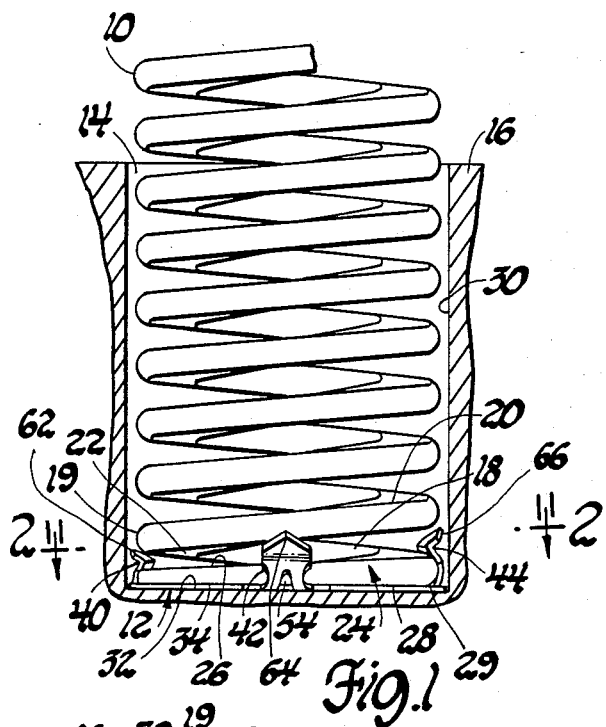
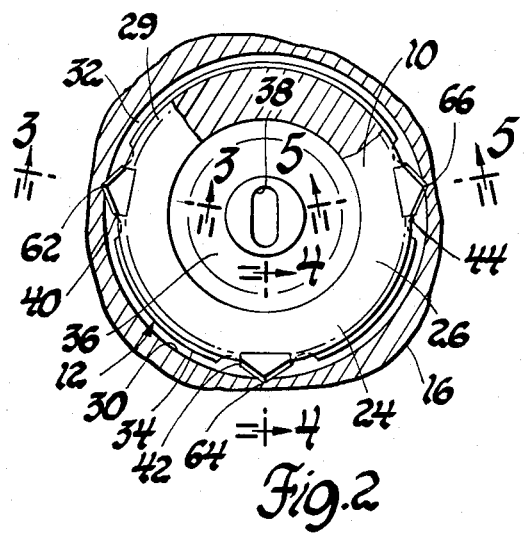
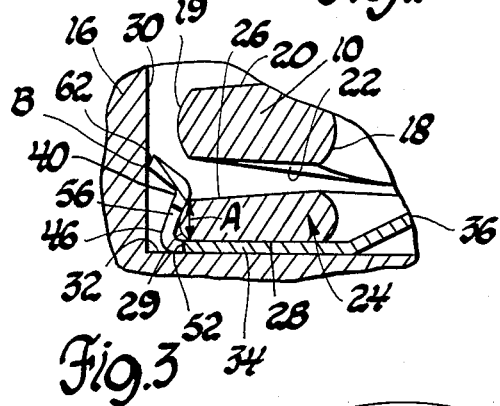
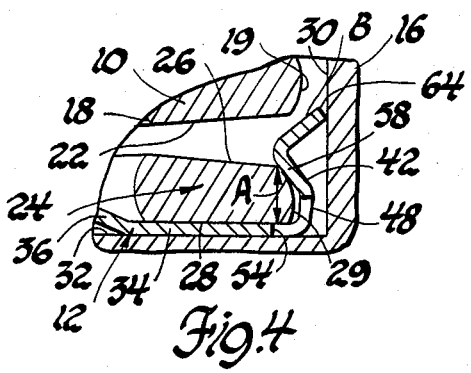
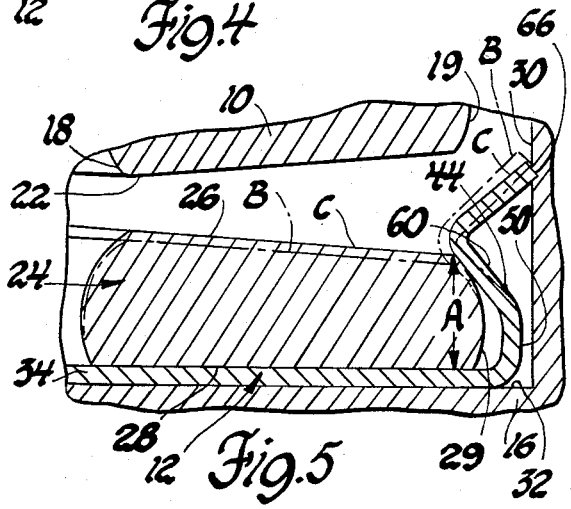
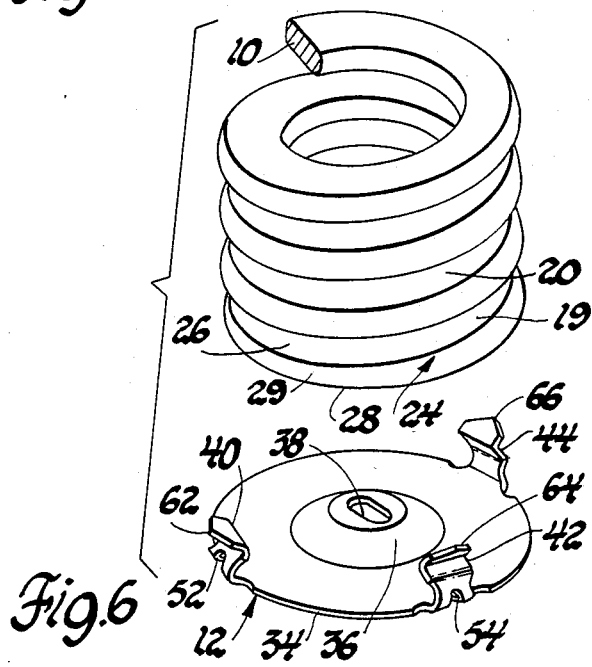
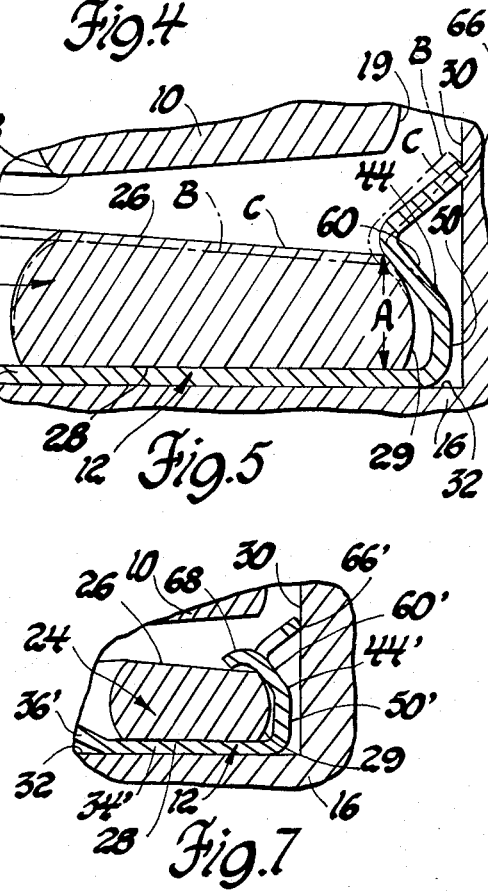

SPRING RETAINER

This invention relates generally to a spring mount and more specifically to a spring mount for releasably retaining a coil compression spring within a cylindrical pocket.

BACKGROUND OF THE INVENTION

Metal forming presses often include a spring pad which incorporates helical compression springs contained within cylindrical spring pockets, the pocket allowing for extra compression length of the spring. Similar springs are also used as stripper springs, and again are contained within cylindrical spring pockets. A spring pad assembly may be seen in the U.S. Pat. No. 3,851,517, to Greenleaf, assigned to the assignee of the present invention. Some means is desirable to retain the spring within the cylindrical spring pocket, and current attachment means include a clip which is fastened to the bottom of the spring pocket by a screw or bolt threaded into a hole in the bottom of the spring pocket, the clip resting over part of the bottom coil to retain the spring within the spring pocket. The use of such clips is time consuming, as a hole must be drilled and threaded at the bottom of the pocket, which may be relatively deep, and a special tool is necessary to hold the clip in place and tighten the screw or bolt. A special tool must also be used to remove the clip and spring when desired.

SUMMARY OF THE INVENTION

The spring mount of the invention overcomes the shortcomings of the prior art by providing an easily attached and removed spring mount which may be threaded while it is outside of the spring pocket and which can be inserted into the spring pocket to retain the spring therein with no special tools and with no drilling or tightening operations.

The spring mount of the invention includes a generally circular base which seats on the bottom of the cylindrical spring pocket of a diameter small enough to clear the cylindrical pocket wall. The base is also engageable with the bottom-most coil of the helical spring, which, in the embodiment disclosed, is ground substantially flat on the bottom, while the upper surface of the bottom coil is helically rising.

A plurality of generally axially extending tangs is circumferentially disposed around the periphery of the base, and are integrally stamped therewith so as to be radially flexible with respect to the base at the juncture therewith. Each tang includes a retention wall which has a bias portion which extends generally radially inwardly of the base and is axially spaced therefrom, each of the plurality of bias portions being axially spaced so as to be disposed in a helix angle which substantially matches the helix angle of the upper portion or surface of the first coil of the spring. This allows the first coil to be attached to the base by threading it within the tangs, with the ground flat bottom surface of the first coil engaged with the spring mount base and the helically rising upper portion of the first coil engaged with the bias portions of the retention wall. The tangs are disposed about the base to include less than 360°, in the embodiment disclosed, so as to be sure to engage the upper portion of only the first coil.

The tangs also include gripping barbs extending radially outwardly from the retention walls. Tightening of the first coil within the bias portions of the retention walls flexes the tangs radially outwardly and moves the gripping barbs to a radially outward position where they will lightly engage at the cylindrical pocket wall as the spring and attached spring mount are inserted into the spring pocket. This latches the spring to the pocket.

The spring and attached mount may be pushed down into the cylindrical pocket until the base of the spring mount seats on the bottom of the spring pocket. Because of the engagement of the barbs with the pocket wall, the spring may then be turned and tightened farther within the tangs to engage the bias portions thereof more tightly and to bias the gripping barbs more tightly into the spring pocket wall to maintain the spring in place. Turning the spring back allows the barbs to loosen and the spring and spring mount to be as quickly removed as it was inserted.

It is, therefore, an object of the invention to provide spring mount to releasably retain a spring within a spring pocket without the use of special tools or drilling operations.

It is yet another object of the invention to devise such a spring mount which allows the spring to be easily removed by relatively rotating spring and mount.

It is a more specific object of the invention to provide such a spring mount in which radially flexible barbed tangs joined to a base of the mount threadably receive the helically rising portion of the first coil of the spring and cooperate therewith to flex outwardly as the coil is tightened within the tangs to non-turnably engage the wall of the spring pocket to retain the spring and mount within the pocket, while flexing radially inwardly again as the spring is turned back to allow the spring and mount to be removed from the spring pocket.

BRIEF DESCRIPTION OF THE DRAWINGS

These and other objects of the invention will appear from the following written description and drawings in which:

FIG. 1 is a view of a cross-section of a cylindrical spring pocket with a spring mount of the invention retaining a spring therewithin, FIG. 2 is a view taken along the line 2—2 of FIG. 1, FIG. 3 is an enlarged view of a section taken along the line 3—3 of FIG. 2, FIG. 4 is an enlarged view of a section taken along the line 4—4 of FIG. 2, FIG. 5 is an enlarged view of a section taken along the line 5—5 of FIG. 2, FIG. 6 is an exploded view of a portion of the spring and the spring mount of the invention, and FIG. 7 is a view similar to FIG. 4 showing an alternative embodiment of the spring mount.

BRIEF DESCRIPTION OF PREFERRED EMBODIMENT

Referring first to FIG. 1, a helical coil spring designated generally at 10 is shown retained by the spring mount of the invention designated generally at 12 within a cylindrical spring pocket designated generally at 14 which is defined in a larger body 16, which may be part of a die or any other element within which it is desired to mount spring 10. Spring 10, in the embodiment disclosed, has coil wire of a generally rectangular cross-section, as best seen in FIG. 3, with slightly rounded inner and outer sides 18 and 19 and top and bottom surfaces 20 and 22 which, while helically rising, are substantially flat in cross-section. Top and bottom surfaces 20 and 22 are not exactly parallel, because the winding operation tends to put the inner side 18 in compression making it relatively thicker. All coils of the spring 10 are substantially uniform except for the first or end coil 24 which, in the spring winding operation, is given a shallower helix angle so that its upper surface or portion 26 does not rise helically as steeply. In addition, most of the bottom surface or portion 28 of end coil 24 is substantially flattened in a grinding operation which makes its outer side 29 thinner. Other springs may have coil wire of different cross-sections and differently shaped first coils, but every first coil will have, by definition, a lower surface or portion, whether it be ground horizontally flat or not, and a helically rising upper surface or portion. It is the first or end coil with this general configuration which cooperates in the retention of spring 10 within spring pocket 14, as will be described below.

Spring pocket 14 has a cylindrical wall 30 of a diameter slightly larger than the diameter of the coils of spring 10 and a circular bottom 32. Body 16, and consequently cylindrical pocket wall 30, will generally be formed of cast iron, although that is not necessary for the invention. Spring 10 is retained within spring pocket 14 by spring mount 12, which may be seen in FIG. 6 removed from spring pocket 14. Spring mount 12 includes a circular base 34 which has a diameter slightly larger than the diameter of the coils of spring 10, but small enough to fit within the pocket wall 30 with radial clearance, so that it can be seated on bottom 32, as best seen in FIG. 1. Still referring to FIG. 6, base 34 also includes a central stamped dimple 36 with a central slot 38 therethrough, for a purpose to be described below. Stamped integrally with the periphery of base 34 are three tangs designated generally at 40, 42 and 44, which, as may be best seen in FIG. 2, are angularly spaced circumferentially to cover something more than 180° and are evenly spaced apart something more than 90° from one another. The exact angular spacing is not crucial, but with most spring configurations it would be desirable that the total angle between tangs 40 and 44 be between 180°–240°, for reasons to be described below.

Tangs 40, 42 and 44, respectively, are shown in cross-section in FIGS. 3–5, and, as may be there seen, each includes a respective retention wall 46, 48 and 50 which is integral with base 34 and which is defined at a radius with respect to base 34 which substantially clears the outer side 29 of first coil 24. Retention walls 46 and 48 are, in addition, provided with lanced openings 52 and 54 to enhance their radial flexibility with respect to base 34. This is unnecessary for retention wall 50, because it has a greater axial length and is inherently more flexible, for reasons next described. Each retention wall 46, 48 and 50 includes a respective bias portion 56, 58 and 60 which extends generally radially inwardly relative to the base 34 at an axial distance A therefrom such that the bias portions 56, 58 and 60 cooperate to define a helix angle substantially matching the rising helix angle of the upper surface 26 of first coil 24. Note axial distance A increases from tang 40 to tang 42 and from tang 42 to tang 44. This allows the first coil 24 to be threaded into tangs 40, 42 and 44, as best seen in FIGS. 3–5, with the bias portions 56, 58 and 60 engaged with upper surface 26 of first coil 24, or more specifically, with the juncture of the outer side 29 of first coil 24 and its upper surface 26. The exact area of engagement is not significant. What is significant is that the bias portions 56, 58 and 60 engage a helically rising surface or portion at points spaced axially away from the juncture of the retention walls 46, 48 and 50 with the base 34. This allows tangs 40, 42 and 44 to flex radially outwardly as first coil 24 is turned to shift circumferentially between each tang's bias portion and the first coil's helically rising surface. Such relative movement creates a tighter interferring engagement between bias portion and coil when the spring is rotated in the clockwise direction as viewed from the perspective of FIG. 2 and a lesser interferring engagement when the spring is rotated counterclockwise. The angular spacing of tangs 40, 42 and 44 described earlier assures that they will engage only the first coil 24, and will not interfere with the remaining coils.

Finally, each tang 40, 42 and 44 includes a hardened gripping barb 62, 64 and 66 which is integral with a respective bias portion 56, 58 and 60. Barbs 62–60 are also axially spaced from base 34, and as first coil 24 is tightened in the clockwise direction, barbs 62, 64 and 66 will also flex radially outwardly. This allows spring 10 to be retained as next described. First coil 24 is threadably received with bottom surface 28 engaged with base 34 and with bias portions 56, 58 and 60 engaged with upper surface 26 as previously described. Spring 10 is turned to more tightly engage upper surface 26 until barbs 62, 64 and 66 flex outwardly to position B shown in FIGS. 3–5, a position where they will lightly engage pocket wall 30. Then, spring 10 and mount 12 can be pushed down within pocket 14 until base 34 seats on bottom 32, with barbs 62–60 lightly engaging and scribing wall 30. This light engagement serves to hold base 34 non-turnably with respect to cylindrical wall 30. Then, spring 10 can be turned slightly in the clockwise direction, to position C shown in FIG. 5, which will bias barbs 66, as well as barb 62 and 64, not shown, more tightly into wall 30. The exact degree of radially outward movement of the barbs 60, 64 and 66 which would occur during this final tightening is exaggerated in FIG. 5 for purposes of illustration. Turning spring 10 back counterclockwise will allow tangs 40, 42 and 44 to flex radially back and remove barbs 62, 64 and 66 from engagement with pocket wall 30 to allow the spring 10 and spring mount 12 to be easily removed. Depending on the weight and size of the spring, relative hardness of the materials, etc., fewer than three gripping barbs may well be sufficient to retain a spring within the spring pocket, but the three barbs as disclosed also serve to center the spring 10 and spring mount 12 within pocket 14 as it is inserted.

An alternative embodiment is shown in FIG. 7, and illustrated just for the axially tallest tang, designated 44'. In this embodiment, a different bias portion, designated at 68, is lanced out of the center of the retention wall 50' and extends radially inwardly to a greater extent over upper surface 26 of first coil 24. It is, of course, still axially spaced away from circular base 34' and will create the same radially outward flexing upon the clockwise turning of spring 10 and the same retention as described above. First coil 24, however, will be more tightly attached to the mount.

An alternative to the attachment method described for both the embodiments would be to thread first coil 24 less tightly and insert spring 10 and mount 12 into spring pocket 14 with barbs 62, 64 and 66 not engaging wall 30 until base 34 seats on bottom 32. At that point, some other means, such as a tool inserted down into slot 38, could be used to hold base 34 non-turnably while spring 10 was turned to create the gripping engagement described above. The primary purpose for slot 38, however, is to allow a hook to be inserted to remove mount 12 from pocket 14 if, for some reason, it would not come out with spring 10 when it was removed.

More broadly, a spring mount operating similarly to that described in the preferred embodiment could be used to attach a spring to a body other than a spring pocket. For example, the barbs could be replaced with locking or latching members of another type, such as simple tabs extending radially outwardly from retention walls of the tangs, which would also move radially outwardly therewith to a latching position under the biasing force of a spring attached threadably in the same way. These latching members would, at latching position, engage or enter some circumferentially disposed latching or keeper portion on or formed in the larger body. Such a latching or keeper portion on the body could be a plurality of circumferentially disposed, radially extending slots formed in the body. Or the edge of a circular under cut could be formed in the body. Or any other structure could be used which would engage the body as the latching members moved radially in one direction, and disengaged as they moved radially in the opposite direction. In each embodiment the same cooperation would exist between the spring, the mount and the body. That is, the retention walls of the tangs and the latching members thereon are all activated into a position retaining the spring to the body by the threadable turning or rotation of the spring with respect to the mount. Again, the exact configuration of the first coil of the spring disclosed in the preferred embodiment is not strictly necessary, as long as the first coil has a lower portion engageable with the base of the mount and a helically rising upper surface or portion engageable with the bias portions of the retention walls of the tangs to create the radial flexing as spring and mount rotate relative to each other.

Although my invention has been described in terms of certain specific embodiments, it is to be understood that other forms may be adopted within the scope of the invention.

The embodiments of the invention in which an exclusive property or privilege is claimed are defined as follows:

1. A spring mount for releasably retaining a substantially cylindrical helical coil spring to a body, said spring being of the type having helically rising coils with the first coil having a lower surface and a helically rising upper surface, comprising,
   a base engageable with the lower surface of the first coil,
   a plurality of generally axially extending tangs circumferentially disposed about the base and joined thereto so as to be radially movable about their juncture with the base,
   each tang including a retention wall with a bias portion extending generally radially relative to the base and axially spaced from the base a distance to define a helix angle in cooperation with the bias portion of another tang, said helix angle so defined substantially matching the helix angle of the upper surface of the first coil, whereby the first coil of the spring when attached to the mount has its lower surface engaging the base and its upper surface engaging the bias portions of the tangs, each said tang moving radially in response to relative rotation of said spring and said base to shift circumferentially the point of engagement of its bias portion with said upper surface,
   and a latching member on at least one of the tangs, said latching member axially spaced from the base for movement radially with said tang between a first position retaining the spring to the body at one said point of engagement and a second position releasing the spring from the body at another said point of engagement.

2. A spring mount for retaining a substantially cylindrical helical coil spring of the type having helically rising coils with a first coil having a lower portion and a helically rising upper portion, within a pocket having a substantially cylindrical wall of a diameter slightly larger than the diameter of the spring, comprising,
   a base seatable on the bottom of the pocket of a size small enough to clear the pocket wall and engageable with the lower portion of the first coil,
   a plurality of generally axially extending tangs circumferentially disposed about the base and joined thereto so as to be radially flexible about the juncture with the base,
   each tang including a retention wall with a bias portion extending generally radially inwardly relative to the base and axially spaced from the base a distance to define, in cooperation with the bias portion of another tang, a helix angle substantially matching the helix angle of the upper portion of the first coil, whereby the spring may be attached to the mount by initially threading the first coil within the tangs to engage the lower portion with the base and the upper portion with the bias portions of the tangs,
   at least one of the tangs further including a gripping barb axially spaced from the base and extending radially outwardly thereof to a non-gripping position relative to the pocket wall when the base and initially threaded spring are within the pocket, whereby the spring and attached mount may be inserted into the pocket until the base seats on the bottom of the pocket,
   said initially threaded spring being turnable relative to the base within the pocket to force the upper portion of the first coil more tightly into the bias portions of the tangs as the upper portion rises axially relative to the bias portions with the rotating spring, to bias the gripping barb into gripping engagement with the pocket wall to fix the spring and attached spring mount within the pocket.

3. A spring mount for retaining a substantially cylindrical helical coil spring of the type having helically rising coils with a first coil having a lower portion and a helically rising upper portion, within a pocket having a substantially cylindrical wall of a diameter slightly larger than the diameter of the spring, comprising,
   a base seatable on the bottom of the pocket of a size small enough to clear the pocket wall and engageable with the lower portion of the first coil,
   a plurality of generally axially extending tangs circumferentially disposed about the base and joined thereto so as to be radially flexible about the juncture with the base,
   each tang including a retention wall with a bias portion extending generally radially inwardly relative to the base and axially spaced from the base a distance to define, in cooperation with the bias portion of another tang, a helix angle substantially matching the helix angle of the upper portion of the first coil, whereby the spring may be attached to the mount by initially threading the first coil within the tangs to engage the lower portion with the base and the upper portion with the bias portions of the tangs, at least one of the tangs further including a gripping barb axially spaced from the base and extending radially outwardly thereof to a position relative to the pocket wall with the barb lightly and non-turnably engaging the pocket wall when the base and initially threaded spring are within the pocket, whereby the spring and attached mount may be inserted into the pocket until the base seats on the bottom of the pocket, said initially threaded spring being turnable relative to the non-turnably held base within the pocket to force the upper portion of the first coil more tightly into the bias portions of the tangs as the upper portion rises axially relative to the bias portions with the rotating spring, to bias the gripping barb into tighter gripping engagement with the pocket wall to fix the spring and attached spring mount within the pocket.

* * * * *